US012381720B2

(12) United States Patent
Chapple

(10) Patent No.: US 12,381,720 B2
(45) Date of Patent: Aug. 5, 2025

(54) SYSTEM AND METHOD FOR DECENTRALIZED CONFIRMATION OF ENTRIES IN A DIRECTED ACYCLIC GRAPH FOR RAPIDLY CONFIRMING AS AUTHENTIC LEDGER ENTRIES WITHOUT REQUIRING CENTRALIZED ARBITRATION OF AUTHENTICITY

(71) Applicant: BESKAR, INC., Falls Church, VA (US)

(72) Inventor: Daniel P. Chapple, Falls Church, VA (US)

(73) Assignee: BESKAR, INC., Falls Church, VA (US)

( * ) Notice: Subject to any disclaimer, the term of this patent is extended or adjusted under 35 U.S.C. 154(b) by 215 days.

(21) Appl. No.: 18/220,702

(22) Filed: Jul. 11, 2023

(65) Prior Publication Data

US 2024/0022398 A1    Jan. 18, 2024

Related U.S. Application Data

(60) Provisional application No. 63/368,458, filed on Jul. 14, 2022.

(51) Int. Cl.
*H04L 29/06* (2006.01)
*H04L 9/00* (2022.01)
(Continued)

(52) U.S. Cl.
CPC ............ *H04L 9/085* (2013.01); *H04L 9/0852* (2013.01); *H04L 9/3218* (2013.01); *H04L 9/50* (2022.05)

(58) Field of Classification Search
None
See application file for complete search history.

(56) References Cited

U.S. PATENT DOCUMENTS 10,042,782 B2 *  8/2018  Struttmann ............ H04L 63/123
10,491,575 B2 * 11/2019  Verzun ................... H04L 9/0662
(Continued)

FOREIGN PATENT DOCUMENTS

KR           102110395      5/2020    ............. G06Q 40/04
WO      WO2020/121325      6/2020    ............. G06F 16/27

OTHER PUBLICATIONS

Amarasekara, et al. "ZPAXOS: An asynchronous BFT PAXOS with a leaderless synchronous group", 21$^{st}$ International Symposium on Parallel and Distributed Computing, Jul. 13, 2022, pp. 1-15.
(Continued)

*Primary Examiner* — Maung T Lwin
(74) *Attorney, Agent, or Firm* — HAYES SOLOWAY P.C.

(57) ABSTRACT

Method and systems for decentralized confirmation of entries in a directed acyclic graph (DAG) for rapidly confirming as authentic ledger entries without centralized arbitration of authenticity are provided. Access is provided to a user account by applying Shamir Secret Sharing, the user account being accessible to a single user and to combined efforts of multiple authorized third-party users appointed by the single user. An identity of the user account is cryptographically obfuscated using post-quantum cryptography. A DAG communication having data is transmitted from the user account to the DAG. DAG communications are weighted via proof-of-work hashing conducted on randomly-selected third-party DAG users, and are recorded and reconciled at nodes that compete to achieve consensus using SABRPaxos protocol, thereby confirming entries in the DAG. Nodes are incentivized by rewarding tokens that are variably determined by calculating the number of communications in a fixed time period and a total number of communications.

20 Claims, 4 Drawing Sheets

(51) Int. Cl.
*H04L 9/08* (2006.01)
*H04L 9/32* (2006.01)

(56) References Cited

U.S. PATENT DOCUMENTS

| | | | | |
|---|---|---|---|---|
| 11,627,639 | B2* | 4/2023 | Verzun | H04W 28/12 |
| | | | | 713/154 |
| 2013/0332449 | A1* | 12/2013 | Amos | G06F 16/9024 |
| | | | | 707/798 |
| 2017/0364450 | A1 | 12/2017 | Struttmann | G06F 12/14 |
| 2020/0136831 | A1* | 4/2020 | Danielson | H04L 9/3247 |
| 2020/0235925 | A1 | 7/2020 | Herra-Vega et al. | H04L 9/08 |
| 2020/0394183 | A1* | 12/2020 | Jois | G06F 16/9024 |
| 2022/0158855 | A1* | 5/2022 | Wentz | H04L 9/3247 |
| 2022/0254136 | A1* | 8/2022 | Kaneko | G06V 30/224 |
| 2022/0368682 | A1* | 11/2022 | Verzun | G06F 21/606 |
| 2023/0162415 | A1* | 5/2023 | Rosen | G06F 16/248 |
| | | | | 345/440 |

OTHER PUBLICATIONS

International Search Report and Written Opinion issued in application PCT/US2023/027408, dated Oct. 6, 2023, 9 pgs.
Bonnetain, et al., "Quantum Security Analysis of CSIDH", Springer International Publishing, 2020, 39 pgs.
Bos, et al. "CRYSTALS-Kyber: a CCA-secure module-lattice-based KEM", IEEE European Symposium on Security and Privacy (EuroS &P) (pp. 353-367), 2018, 15 pgs.
Brassard et al., "Limitations on Practical Quantum Cryptography" Physical Review Letters, vol. 85, No. 6, Aug. 7, 2000, 4 pgs.
Buchmann, et al., "XMSS—A Practical Forward Secure Signature Scheme Based on Minimal Security Assumptions," Post-Quantum Cryptography: 4th International Workshop, PQCrypto 2011, Taipei, Taiwan, Nov. 29-Dec. 2, 2011, 22 pgs.
Bunz, et al. "Bulletproofs: Short Proofs for Confidential Transactions and More." Stanford University, 2018, 46 pgs.
Castro, et al., "Practical Byzantine Fault Tolerance," Proceedings of the Third Symposium on Operating Systems Design and Implementation, Feb. 1999, 14 pgs.
Castryck, et al., "CSIDH: An Efficient Post-Quantum Commutative Group Action", Advances in Cryptology—ASIACRYPT 2018: 24th International Conference on the Theory and Application of Cryptology and Information Security, 2018, 33 pgs.
Celi, et al., KEMTLS: Post-Quantum TLS Without Signatures, Cloudflare, Jan. 2021, https://blog.cloudflare.com/kemtls-post-quantum-tls-without-signatures/, accessed Aug. 30, 2023, 13 pgs.
Childs, et al., "Constructing Elliptic Curve Isogenies in Quantum Subexponential Time", Dec. 17, 2010. J. Math. Cryptol., 8(1):1-29, 2014, 29 pgs.
Costello, et al., "Efficient Algorithms for Supersingular Isogeny Diffie-Hellman", Annual International Cryptography Conference, Advances in Cryptography, 2016, 34 pgs.
Couveignes, "Hard Homogeneous Spaces", Aug. 24, 2006. Cryptology ePrint Archive, https://eprint.iacr.org/2006/291.pdf , accessed Aug. 30, 2023, 15 pgs.
Dowd, "New Private Monies: A Bit-Party Player?" The Institute of Economic Affairs. 2014, 115 pgs.
Fishbein, "Machine-Level Software Optimization of Cryptographic Protocols", University of Waterloo, 2014, 67 pgs.
Gągol, et al. "Aleph: Efficient atomic broadcast in asynchronous networks with byzantine nodes." Proceedings of the 1st ACM Conference on Advances in Financial Technologies. 2019, 34 pgs.
Galbraith, "Authenticated Key Exchange for SIDH", University of Aukland, NZ. Mar. 13, 2028, 17 pgs.
Grover, "A fast quantum mechanical algorithm for database search", Proceedings of 28th Annual ACM Symposium on the Theory of Computing, 1996, pp. 212-219, 8 pgs.
Jain et. al., "Trojan-horse attacks threaten the security of practical quantum crytograpohy", New Journal of Physics 16, 2014, 21 pgs.
Jao et al., "Towards quantum-resistant cryptosystems from supersingular elliptic curve isogenies." Post-Quantum Cryptography: 4th International Workshop, PQCrypto 2011, Taipei, Taiwan, Nov. 29-Dec. 2, 2011. Proceedings 4. Springer Berlin Heidelberg, 2011, 15 pgs.
Jia, et al., "Quantum Secret Sharing," Jun. 8, 2019, 5 pgs.
Kitenko, et al., "Quantum-Secured Blockchain", Quantum Science and Technology, May 2017, 7 pgs.
Koziel, et al. "An exposure model for supersingular isogeny Diffie-Hellman key exchange", RSA Conference 2018, Springer International Publishing, 19 pgs.
Lamport, "The Part-Time Parliament", ACM Transaction on Computer Systems, vol. 16, No. 2, May 1998, pp. 133-169, 37 pgs.
Moser, et al. "An Empirical Analysis of Traceability in the Monero Blockchain", Proceedings on Privacy Enhancing Technologies (1-22), Apr. 23, 2018, 22 pgs.
Nakamoto, "Bitcoin: A Peer-Peer Electronic Cash System", N.p.. Web. Jan. 30, 2014, https://bititcoin.org/bitcoin.pdf , accessed Aug. 31, 2023, 9 pgs.
Original Raiblocks/Nano Whitepaper, accessed at https://docs.nano.org/whitepaper/english/, 2021, 20 pgs.
Perrin, "KEM-based Hybrid Forward Secrecy for Noise," Revision 1, Nov. 2018, 6 pgs.
Rostovtsev, et al. "Public-key cryptosystem based on isogenies." Cryptology ePrint Archive, 2006, 19 pgs.
Shor, "Polynomial-time algorithms for prime factorization and discrete algorithms on a quantum computer", original published in SIAM Journal on Computing, vol. 26, No. 5, 1997, 30 pgs.
Sun, et al. "Toward Quantum-Resistant Strong Designated Verifier Signature from Isogenies",2012 Fourth Int'l Conference on Intelligent Networking and Collaborative Systems, IEEE, 2012, 5 pgs.
Westfall, et al., "Quantum Threats to Blockchain Based on a Review of Simulations", Pace University, Pleasantville, NY, undated, 7 pgs.
World Economic Forum White Paper, "Inclusive Deployment of Blockchain for Supply Chains, Part 6—A Framework for Blockchain Interoperability", Apr. 2020, 26 pgs.

* cited by examiner

SYSTEM AND METHOD FOR DECENTRALIZED CONFIRMATION OF ENTRIES IN A DIRECTED ACYCLIC GRAPH FOR RAPIDLY CONFIRMING AS AUTHENTIC LEDGER ENTRIES WITHOUT REQUIRING CENTRALIZED ARBITRATION OF AUTHENTICITY

CROSS REFERENCE TO RELATED APPLICATION

This application claims benefit of U.S. Provisional Application Ser. No. 63/368,458 filed Jul. 14, 2022, the entire disclosure of which is incorporated herein by reference.

FIELD OF THE DISCLOSURE

The present disclosure is generally related to computerized database management and more particularly is related to a system and method for decentralized confirmation of entries in a directed acyclic graph for rapidly confirming as authentic ledger entries without requiring centralized arbitration of authenticity.

BACKGROUND OF THE DISCLOSURE

Decentralized ledger technology has been associated for use in managing data in various industries, including within healthcare, inventory asset management, election security, and finance. Decentralized ledgers allow consensus in a zero-trust environment, where parties unknown to each other and with no reason to trust each other can still reach agreement on truth. The revolution created by decentralized records management has been so transformative that it is popularly termed "Web 3.0." However, traditional decentralized ledger technology suffers from competing demands of decentralization, security, and scalability, where improvements in any one of these areas traditionally results in a decrease of efficiency in the other areas.

Various proposals have been made to address this issue, but they have drawbacks in terms of benefits and implementation. For example, some proposed solutions do not allow for desired levels of security of the data to be achieved, while other solutions require the implementation of new protocols which are unlikely to be adopted by the current industry.

Thus, a heretofore unaddressed need exists in the industry to address the aforementioned deficiencies and inadequacies.

SUMMARY OF THE DISCLOSURE

The present disclosure can also be viewed as providing methods for decentralized confirmation of entries in a directed acyclic graph (DAG) for rapidly confirming as authentic ledger entries without the need for centralized arbitration of authenticity. In this regard, one embodiment of such a method, among others, can be broadly summarized by the following steps: providing access to at least one user account by applying Shamir Secret Sharing (SSS) to the at least one account, wherein the user account is accessible to a single user and to combined efforts of multiple authorized third-party users appointed by the single user; cryptographically obfuscating an identity of at least one user account using post-quantum cryptography and transmitting a DAG communication having a quantity of data from the at least one user account to the DAG; weighting DAG communications via proof-of-work hashing conducted on randomly-selected third-party DAG users; recording and reconciling DAG communications at nodes that compete to achieve consensus using Secure Asynchronous Byzantine-Resilient Paxos (SABRPaxos) protocol, thereby confirming entries in the DAG; and incentivizing nodes for quickly recording and reconciling DAG communications by rewarding tokens that are variably determined by calculating the number of communications in a fixed time period and a total number of communications.

Embodiments of the present disclosure provide a system for decentralized confirmation of entries in a directed acyclic graph (DAG) for rapidly confirming as authentic ledger entries without centralized arbitration of authenticity. Briefly described, in architecture, one embodiment of the system, among others, can be implemented as follows. A computerized device has a processor, a non-transitory memory, and an application which includes instruction executable by the processor. The instructions include: providing access to at least one user account by applying Shamir Secret Sharing (SSS) to the at least one account, wherein the user account is accessible to a single user and to combined efforts of multiple authorized third-party users appointed by the single user; cryptographically obfuscating an identity of at least one user account using post-quantum cryptography and transmitting a DAG communication having a quantity of data from the at least one user account to the DAG; weighting DAG communications via proof-of-work hashing conducted on randomly-selected third-party DAG users; recording and reconciling DAG communications at nodes that compete to achieve consensus using Secure Asynchronous Byzantine-Resilient Paxos (SABRPaxos) protocol, thereby confirming entries in the DAG; and incentivizing nodes for quickly recording and reconciling DAG communications by rewarding tokens that are variably determined by calculating the number of communications in a fixed time period and a total number of communications.

The present disclosure can also be viewed as providing a method for decentralized confirmation of entries in a directed acyclic graph (DAG) for rapidly confirming as authentic ledger entries without centralized arbitration of authenticity. Briefly described, in architecture, one embodiment of the method, among others, can be implemented with the following steps: providing access to at least one user account by applying a cryptographic algorithm to the at least one account, wherein the user account is accessible to a single user and to combined efforts of multiple authorized third-party users appointed by the single user; cryptographically obfuscating an identity of at least one user account using post-quantum cryptography and transmitting a DAG communication having a quantity of data from the at least one user account to the DAG; weighting DAG communications via proof-of-work hashing conducted on randomly-selected third-party DAG users; recording and reconciling DAG communications at nodes that compete to achieve consensus using Secure Asynchronous Byzantine-Resilient Paxos (SABRPaxos) protocol, thereby confirming entries in the DAG, wherein the SABRPaxos protocol is formed from XPaxos and features of EPaxos, and incentivizing nodes for quickly recording and reconciling DAG communications by rewarding tokens that are variably determined by calculating the number of communications in a fixed time period and a total number of communications.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Various improvements have been proposed to solve the problems with decentralized ledger technology, as described in the Background. One proposed solution to peer-to-peer ledger technology, like the blockchain, has been a decentralized acyclic graph (DAG), but practical implementations have demonstrated that DAG also requires centralization. Furthermore, financial implementations of decentralized ledgers suffer from massive price swings and an inability for ordinary users to access their records if they forget their access codes.

Traditional record management technology requires trust between independent record users, and consequently suffers from issues of speed, access, and high cost. These shortcomings are particularly apparent in the financial services industry, where remittances from foreign workers are often slow and subjected to high transaction fees, driving users to less established and less trustworthy financial solutions. Similarly, the slow speed of institution-to-institution transactions and the large amounts possible in transactions facilitates illegitimate transactions, as occurred when North Korea stole $1.3 billion dollars from the Bangladesh National Bank by exploiting weaknesses in the SWIFT implementation of trust.

Various solutions to the competing demands of decentralization, security, and scalability have been considered. The most immature of these proposed solutions conflate security with secrecy; a decentralized ledger only allows security and offers very little secrecy. The more serious proposed solutions attempt to introduce new consensus protocols or new ledger technologies. However, these proposals still fall short of achieving data management through decentralized ledger technology which provides high decentralization, security, and scalability.

The present disclosure is directed to decentralized confirmation of entries in a directed acyclic graph for the purpose of rapidly confirming as authentic ledger entries without the need for centralized arbitration of authenticity. As discussed in detail herein, the zero-trust system uses a Paxos Protocol variant whereby operators of independent and competing nodes race to complete a pre-defined historical block of time-stamped and cryptographically signed communications, and broadcast that first hash to the network using the Paxos Protocol variant. Once more than 50% of all nodes have accepted the new XMSS hash, it is appended to the DAG history, broadcast to all nodes and clients, and becomes the new authoritative source for all subsequent DAG transactions.

Figure 1:
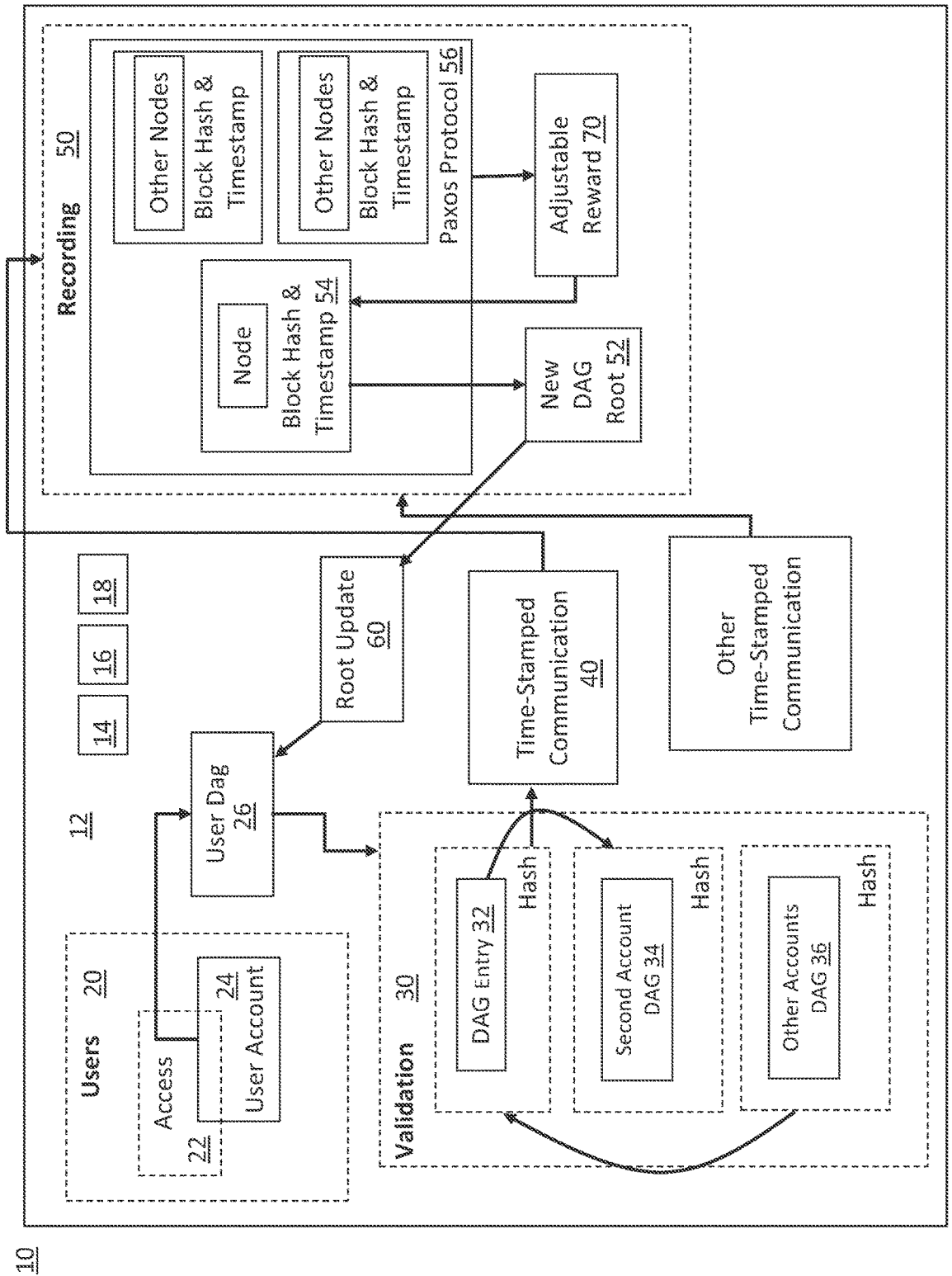
FIG. 1 is a diagrammatical illustration of a method and system for decentralized confirmation of entries in a directed acyclic graph for rapidly confirming as authentic ledger entries without the need for centralized arbitration of authenticity, in accordance with embodiments of the present disclosure.

FIG. 1 is a diagrammatical illustration of flowchart describing a method and system 10 for decentralized confirmation of entries in a directed acyclic graph for rapidly confirming as authentic ledger entries without the need for centralized arbitration of authenticity, in accordance with a first exemplary embodiment of the present disclosure. As shown in FIG. 1, the method and system 10 describes the architecture, modules, and various features, and also illustrates associated method steps and functionality of operation of the present disclosure. All variations and modifications to the described method and system 10 and method are considered within the present disclosure.

The method and system 10 utilize a computerized device 12 having a processor 14 and a non-transitory memory 16. The computerized device 12 may include, for example, a server, a computer, a network of servers and/or computers which are interconnected using a communication network, such as the Internet, or any other type of computing device, or combination thereof. The computerized device 12 may have an application 18 which includes instruction stored in the memory 16 and executable by the processor 14 which cause predetermined functionality. Any additional computing components may also be included within the computerized device 12, including any number or type of input/output devices, hardware, software, firmware, communication connections, or other features.

The method and system 10 may be initiated within a user module 20 housed in the computerized device 12, where the user utilizes an access module 22 to access at least one user account 24. It may be common for more than one user account 24 to be present within the method and system 10. Access to the user account may be enabled by the Shamir Secret Sharing (SSS) cryptographic algorithm, which can be used to secure a secret—such as secured data—in a distributed way, most often to secure other encryption keys, where the secret is split into multiple parts, called shares, which individually should not give any information about the secret. Accordingly, access to an account can provided to both a single user with a cryptographic secret known only to that single user, and/or by a group of users, each of whom possesses a cryptographic secret, or a portion thereof, where the combined efforts of the group of users, or a portion of the group of users, which allow the same access to the account as the single user previously described. It is noted that the group of users may be multiple, authorized third-party users appointed by the single user, or identified or selected in a different manner.

The details or data of the account may contain various items necessary for the functioning of the method and system 10, depending on the specific implementation and use of the method and system 10. For instance, the details or data of the account may pertain to inventory data, financial records, inventory supply, property records, identity management, computer authentication, voter identification, or other data which is use or industry-dependent, that require unknown parties to achieve consensus. As such, the specific account, single user, or multiple user may vary depending on the implementation of the method and system 10. For example, when the method and system 10 is used with rapid transaction and accounting entries, the user account may include a user wallet of the single user and the multiple authorized third-party users appointed by the single user may include authorized third-party personnel of a financial institution. In another example, when the method and system 10 is used with healthcare activity entries, the user account may include patient healthcare record of the single user and the multiple authorized third-party users appointed by the single user may include authorized third-party personnel of a healthcare provider. In this example, the data transmitted from the account may include at least one treatment record in the patient healthcare record. In another example, when the method and system 10 is used with inventory, the user account may include a business inventory ledger of the single user and the multiple authorized third-party users appointed by the single user may include authorized business inventory managers. In this example, the data transmitted from the account may include at least one transaction in the business inventory ledger. Other examples and uses of the method and system 10 are also possible, all of which are considered within the scope of this disclosure.

The user may make a communication or initiate a transmission of a communication involving the account, where the communication includes a quantity of data to be transmitted from the account or otherwise associated with the account, which may be referred to as a DAG communication. This is shown at the User DAG block 26, at which point, the data within the communication are cryptographically secured using the post-quantum encryption of Kyber-1024, or another similar technique, and the user identity is cryptographically obfuscated using a technique such as bulletproofs, which are zero-knowledge proofs that cryptographically obfuscate the identifying details of a communication sender while facilitating a cryptographically irrefutable link between the sender of the communication and the details of the communication. It is noted that the identity of the user may be cryptographically obfuscated prior to transmission of the DAG communication.

The DAG communication in the exchange may be transmitted in various ways, such as via classical computing channels. In one example, the DAG communication may include at least five items or data points, including: 1) the cryptographic identity of the sender; 2) the cryptographic identity of the receiver; 3) the time of creation; 4) a reference to the previous communication; and 5) a note or hash reference about the communication. In another example, DAG communications may require three parts, including: 1) a send communication from the sender's ledger; 2) a receive from the recipient's ledger; and 3) a broadcast that the communication occurred. Other examples may require other parts. Consequently, synchronizing transactions may be asynchronous, e.g., relying on the associative property of addition, and settled ledger actions may be separated from unsettled ledger transactions.

Validation of ledger actions may be achieved in the validations module 30. For a DAG communication to be validated or verified, the communication may be required to meet certain parameters. For instance, in one example, the DAG communication must not already be in an open ledger or must connect to a reference on an authoritative DAG root 60, as discussed later. The communication must also be signed by the account owner, the ledger must have an open space, and the previous communication must be the head of the ledger. Prior to a communication occurring, the sender must complete a small proof-of-work (POW) challenge on another, randomly-selected user's ledger, as shown at block 32. This POW challenge uses a POW hashing conducted on randomly-selected third-party DAG users, and serves the purpose of increasing the weight of another user's valid ledger entry and discouraging flooding attacks on the system. Similarly, other randomly selected users complete a small POW challenge on the communication sender's ledger entry, as shown at block 34 with a second account DAG and block 36 with other accounts DAG. The result of validation at block 30 is time-stamped communication histories of the DAG.

These time-stamped communication histories may be broadcast throughout the network, each in a single-step communication, as shown at block 40. Competing nodes may collect communication histories from throughout the network and, at a pre-defined group of communications, securely hash a group of communications using various post-quantum cryptography techniques, such as post-quantum eXtended Merkle Signature Schemes (XMSS), which allows for the creation of a new DAG root to which all user accounts can point, as shown in block 52 of the recordings module 50. The XMSS hash is time-stamped at creation and the XMSS hash and time-stamp is transmitted throughout the network to other nodes, as shown at block 54.

Recording and reconciliation of the DAG communications at nodes that compete may be completed in the recordings module 50 to achieve consensus, thereby confirming entries in the DAG. Nodes may compete against each other, as shown in block 56, to hash and transmit a group of communications. Using the Paxos Protocol, nodes may achieve a consensus on the first hash block of the group of communications. When 50% or more of the nodes reach agreement using the Paxos Protocol on the hash block of communications, the first node that transmitted the XMSS hash of communications may be determined to be the winner. In the method and system 10, a variant of the Paxos Protocol may be implemented which is referred to as a Secure Asynchronous Byzantine-Resilient Paxos (SABRPaxos) protocol. The SABRPaxos protocol combines XPaxos to tolerate Byzantine failure, along with features of Egalitarian Paxos (EPaxos) to achieve optimal commit latency even when failures occur, uniform load balancing across replicas to achieve high throughput, and graceful performance degradation when replicas are slow or crash. As a foundation, the SABRPaxos protocol builds on Byzantine Paxos. In one example, each user DAG may have its own Paxos instance. The hash of the winning DAG root produced by the Paxos variant is transmitted throughout the network to users, for users to reference all subsequent communications, as shown at block 60.

Nodes may also be incentivized to collect groups of user communications, hash those communications, and transmit those XMSS hashes through an adjustable reward of system tokens, as shown at block 70. For example, nodes may be incentivized to quickly record and reconcile DAG communications by rewarding tokens. The reward, as embodied by tokens, may be may variably determined by automatically calculating 1) the number of communications in a fixed time period and 2) the total number of communications in the system. These data sets may be known within the method and system 10 and from these data sets the reward may be automatically adjusted.

To provide further details relative to the improvements in quantum security that the present disclosure provides, it is noted that distributed ledgers, also referred to as cryptocurrencies because they rely on cryptography to function, if truly immutable, cannot rely on cryptography to keep information secret. This is because of the basic cryptographic premise that every cryptographic system fails on secrecy given enough time. In a distributed ledger, the cryptography, instead of storing secret information, creates information that is theoretically impossible to change based on the security of the underlying cryptographic premise. In the present disclosure, there is a difference between quantum security and quantum secrecy, and the distributed ledger is made more secure than any other implementation.

It may be important to distinguish between hash functions and key infrastructure encryption schemes when discussing quantum security; hash and encryption are not the same and have different post-quantum vulnerabilities. Since hash functions are not encryption functions, they cannot be decrypted; most cryptographic hashes are only slightly affected by quantum computing. Generally, a cryptographic hash is considered quantum-safe if it uses 384 bits or more. This is different from encryption; most public-key encryption is vulnerable to quantum attacks.

The security of proof-of-work (POW) implementations, such as Bitcoin, relies on a fundamental facet of modern encryption that multiplying two very large prime numbers is easy, while factoring their product to reverse this process is exceptionally difficult. For example, Bitcoin's hashing function (SHA256) requires an average of $2^{60}$ calculations. This is known as the Boolean satisfiability problem (3SAT), which is NP-complete in classical computing. Essentially, there are not enough computers in the universe and time left in existence to reverse modern encryption using non-quantum computers.

Grover's search algorithm, however, can rapidly solve the Boolean satisfiability problem of a classic blockchain. A qubit (as opposed to a bit) exists in a superposition that allows it to be associated with all possible states with certain probabilities (both on and off) with the probabilities of being in a state quantified by amplitude. Qubits are unique in that they can be entangled, where more than one qubit interacts such that the state of a qubit cannot be described independently of the other qubits. Grover's search exploits this condition through a Hadamard gate, which constructs superimposed states from individual qubits:

$$H_1 = \frac{1}{\sqrt{2}}\begin{pmatrix} 1 & 1 \\ 1 & -1 \end{pmatrix} \text{in } \{|0\rangle \text{ and } |1\rangle\} \text{basis}$$

By applying a Hadamard gate on the first n qubits of initial state $|0\rangle n$, it is possible to derive uniform superposition of every possible argument. Grover's search allows a quadratic speedup on inverse hash functions, which would allow a party using Grover's search to mine at incredible efficiency and make a 51% attack on the network plausible.

In the conventional art, there have been proposals of plausible alternatives to a POW system that would be less vulnerable to a Grover search; they specifically focus on delayed proof-of-work and proof-of-stake (POS). POS and Proof of Capacity are feasible alternatives to the quantum risk to POW consensus algorithms; however, in non-POW implementations, quantum computing is still a threat to the security of encrypted wallets and the security of these systems (quantum computing is also a threat to fiat-currency encryption). Although quantum computers are not currently able to process the required number of qubits to conduct a Grover search on Bitcoin or to break the encryption of classically-encrypted systems, the growth in quantum computing power indicates that this is a near-term threat.

Consequently, a future decentralized and anonymous digital currency must solve the inherent vulnerability of modern cryptocurrency and achieve a reliable measure of quantum security. Kyber-1024 has a security of AES-256, both against a theoretical quantum attack and against a classic attack. It is based on the Solving Learning with Errors problem over module analysis. Kyber-1024 has the additional advantage that it has uses in mobile applications, facilitating a mobile client implementation of the system. The overall scheme has a 1 kB key size and a 2 kB signature size—too large for a traditional UDP transmission but well within the limits of a single TCP/IP packet. As many cryptographic systems are openly available, it is also unlikely that the scheme has a kleptographic backdoor, similar to the backdoor that Edward Snowdon revealed that the United States National Security Agency inserted into the Dual EC DRBG standard. For added security, the subject disclosure may implement hybrid forward secrecy with noise.

In the subject disclosure, a Kyber-1024 secure key encapsulation mechanism may be used in a hybrid implementation with a pre-quantum encryption scheme of American Encryption Standard (AES) or a similar classical encryption scheme such as Hybrid Public Key Encryption (HPKE), the new public key encryption standard specified in RFC 9180. To this end, FIG. 2 is a diagrammatical illustration of a method and system of hybrid post-quantum and AES encryption and FIG. 3 is a diagrammatical illustration of a method and system of post-quantum encryption, both of which can be used the method and system for decentralized confirmation of entries in a directed acyclic graph for rapidly confirming as authentic ledger entries without the need for centralized arbitration of authenticity of FIG. 1, in accordance with embodiments of the present disclosure.

Figure 2:
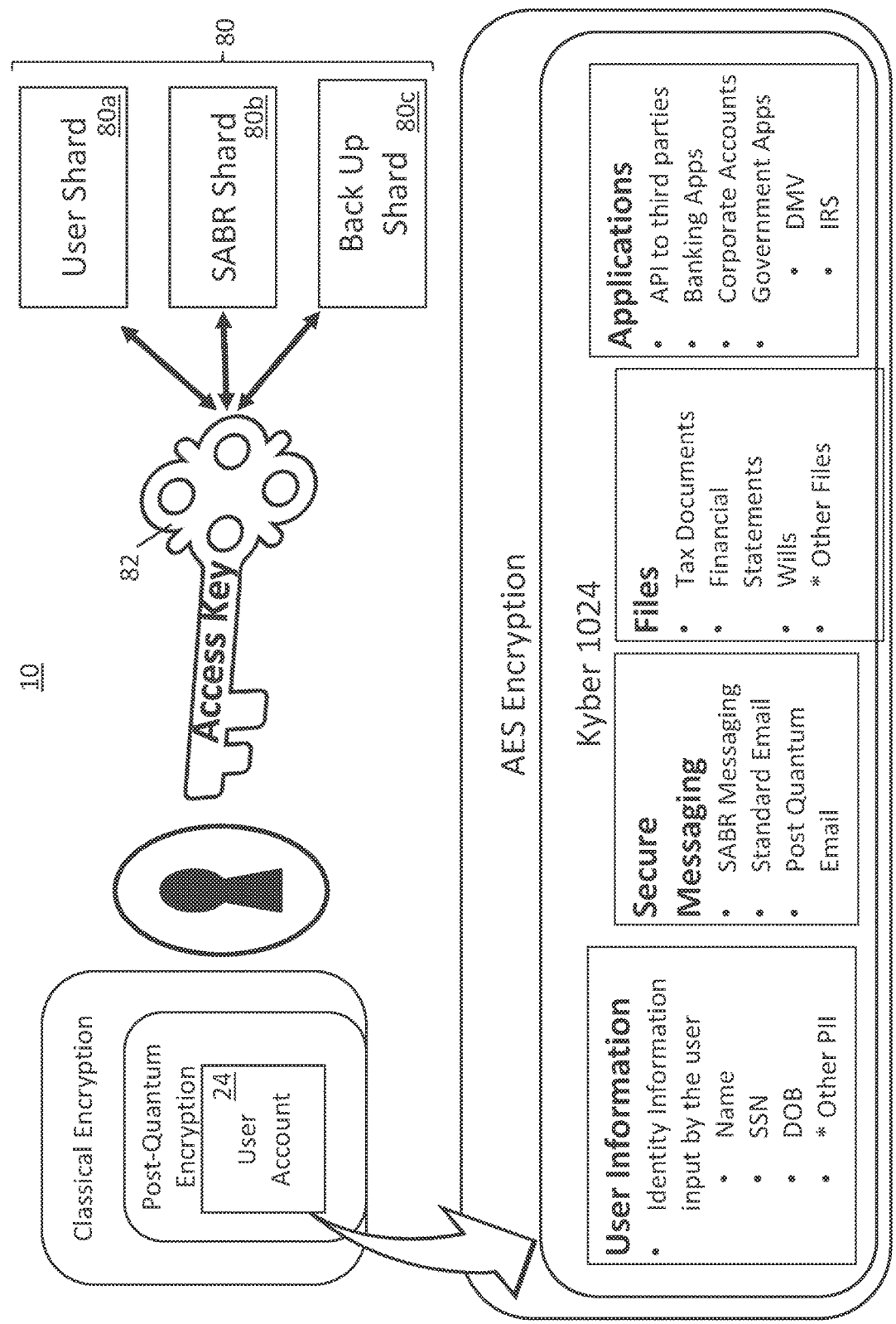
FIG. 2 is a diagrammatical illustration of a method and system of hybrid post-quantum and AES encryption used with the method and system for decentralized confirmation of entries in a directed acyclic graph for rapidly confirming as authentic ledger entries without the need for centralized arbitration of authenticity of FIG. 1, in accordance with embodiments of the present disclosure.
Figure 3:
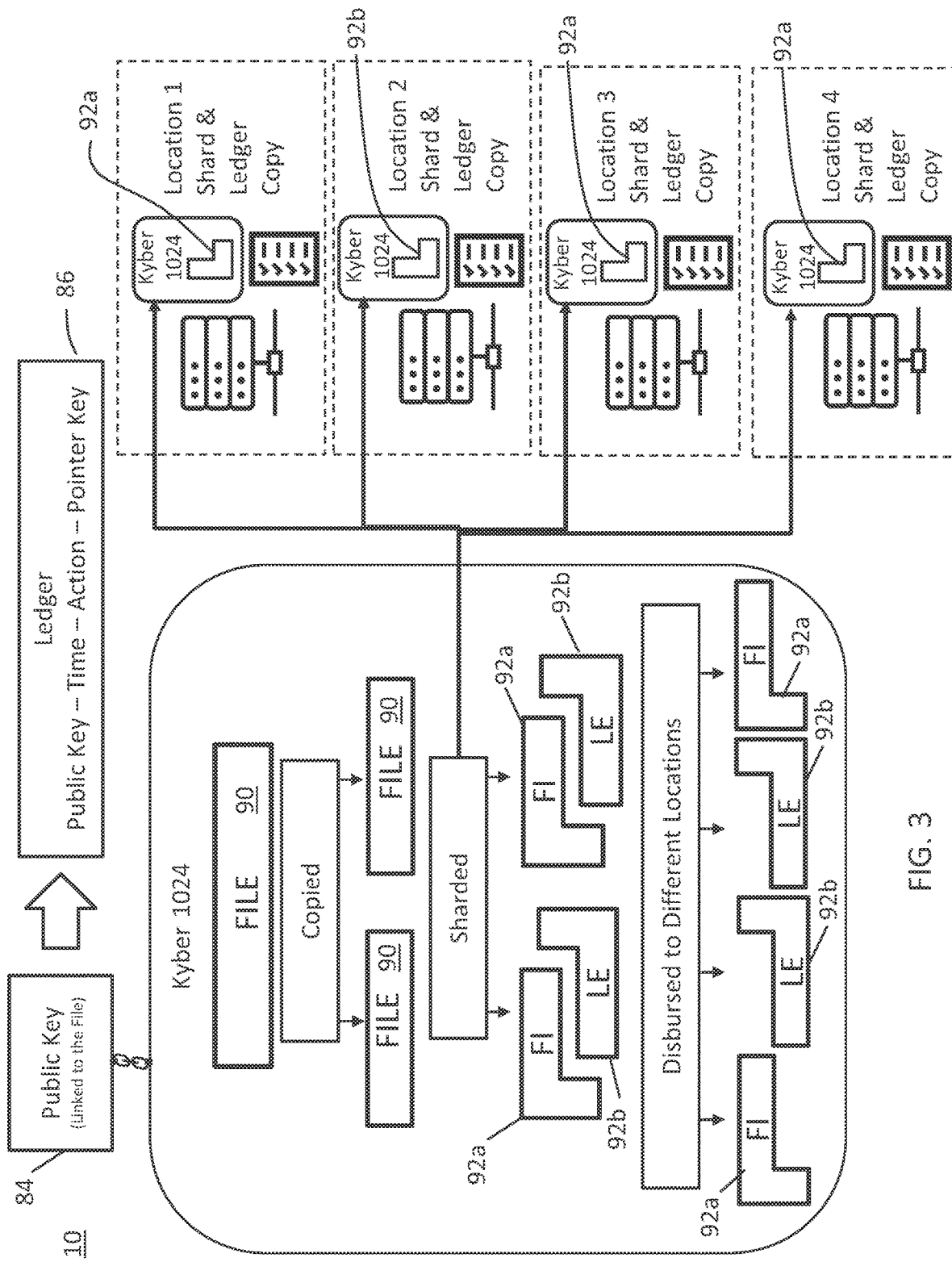
FIG. 3 is a diagrammatical illustration of a method and system of post-quantum encryption used with the method and system for decentralized confirmation of entries in a directed acyclic graph for rapidly confirming as authentic ledger entries without the need for centralized arbitration of authenticity of FIG. 1, in accordance with embodiments of the present disclosure.

As shown in FIG. 2, encryption may include the use of a Kyber-1024, or another post-quantum secure key encapsulation mechanism, which allows data from the user account to be transmitted securely. Kyber 1024 may secure various information from the user, such as user identifying information which is input by the user. This may include the user's name, social security number (SSN), date of birth (DOB), or other input information. Kyber 1024 may permit secure messaging of data from the user account, including the user identifying information, or data files, such as tax documents, financial statements, or wills, or any other information, which can be sent using a SABR messaging technique, using standard e-mail, or using post-quantum messaging. It is noted that the use of Kyber 1024 may have various applications, such as with APIs to third parties, with apps for various entities or industries, or with governmental organizations.

The encryption using Kyber 1024 may utilize an access key 82 which requires at least two shards 80 to be used.

Shards 80 may be characterized as divisions of a whole which each contain data that is unique to it and independent of other shards 80. The use of shards 80 may allow for the totality of the data to be spread between different entities or locations to ensure enhanced security, since the access key cannot be achieved with only a single shard 80, but that when two or more of the shards 80 are combined, there may be a sufficient recombination of the underlying data to grant access by use of the access key 82. In the example of FIG. 2, the shards 80 may include the user shard 80*a* which is associated with the user of the account, a SABR shard 80*b* which is associated with the SABR protocol, and a backup shard 80*c* which may be used in the event that the other shards are not available. Other shards 80 may also be used, depending on the design and implementation of the method and system 10, such as shards 80 associated with the multiple authorized third-party users.

FIG. 3 illustrates details of the Kyber 1024 method for providing post-quantum encryption. As shown, a public key 84 may be linked to a data file 90 being encrypted, where the public key 84 may be transferred to a ledger 86. The data file 90 may be encrypted with Kyber 1024, where the initial file 90 is copied or duplicated to generate two data files 90. These two data files 90 are then sharded, such that each data file is separated into two or more shards 92*a*, 92*b*, as shown in FIG. 3. These shards 92*a*, 92*b* may then be disbursed to different locations. For instance, a first shard 92*a* may be sent to location 1 along with a ledger copy, a second shard 92*b* may be sent to location 2 along with a ledger copy, a third shard 92*a* may be sent to location 3 along with a ledger copy, a fourth shard 92*b* may be sent to location 4 along with a ledger copy.

For the ledger, it was determined that eXtended Merkle Signature Schemes (XMSS) may offer the greatest promise. XMSS has the additional advantage of offering a blockchain-optimized signature scheme known as BPQS, which allows shorter signatures and faster key generation. XMSS, as compared to pre-quantum implementations, brings several advantages including minimum security standards and a 25% reduction in signature size as compared to the provably secure hash based signature schemes.

In addition to the quantum-secure cryptographic techniques used herein, the use of the directed acyclic graph (DAG), may provide additional improvements in speed, scalability, and low cost (both environmental cost and communication/transaction cost). Like a blockchain, a DAG is a form of distributed ledger technology, but unlike a blockchain, a new transaction in a DAG simply registers older transactions. While blockchains use blocks and decentralized validation to authenticate transactions, DAGs use previous transactions as proof of validation. In theory, DAGs assess a whole path back to the DAG's very first transaction to ensure that a sender has sufficient balance. If users build on an invalid path, their own transaction will be ignored, even if their transaction was legitimate. As transactions can be added quickly and as there is virtually no cost to adding transactions, DAGs are sometimes advertised as infinitely scalable.

However, the low cost and rapid transmission of transactions leads to one of the first shortcomings with a DAG. The record of all transactions in a DAG quickly grows to the point that existing user's storage capacity cannot contain all the records in a DAG. As a solution to this shortcoming, many DAGs will prune the data at some point, which means that the record of a DAG ceases to be immutable and compromises the high security that is offered with traditional ledgers like blockchain. While a possible solution to pruning is sharding, where multiple local copies of a DAG are held, in some cases, sharding may only exacerbate the security challenges of a DAG because, where there was once a single record to the first transaction, there are now multiple records. For this reason, at best, DAGs are only 33% resistant to a Sybil attack.

Commercial DAG traditionally address this contravention through a centralized authority that they claim will be eventually disabled. Examples of this centralized authority include the IoTA tangle or the DAGCoin (now Byteball) witness. While the long term intention of these system is likely to eventually decentralize them, any system that starts with centralization has a capacity for the centralization to be reactivated in the future, perhaps by a malicious attacker. Additionally, it is unclear how current DAG can maintain a single history and scale at the level required to be a true currency replacement.

The implementation of the present disclosure is a time-sequenced DAG. A communication transmission begins with an announced communication that, in one example, has four elements: the message, a timestamp of the message, the post-quantum signature verifying the message (transmitted with bulletproofs), and a hash of a randomly-selected other user's block. This communication contains no sensitive information that must remain secret, as it will be immutably recorded to a distributed ledger. Each participant in the system maintains their own lightweight ledger that traces its transmission history to an authoritative source.

At the start of communication, a sender and a receiver verify that their DAG refers to the same authoritative source. For a user to communicate with another user, the user must have an open block on their ledger, which indicates that they have no pending communications. Once broadcasted to the network, the communication is marked as pending until the receiving party signs a block to accept the communication. To complete a communication, the recipient of the initial communication must create a receive block on their own ledger chain. The source field references the hash of the associated send communication. Once this block is created and broadcasted, the communication is marked as finalized.

Prior to sending a communication, a user must complete a small POW challenge on another, randomly-selected, user's block. This small POW is implemented to limit flooding/denial of service attacks on the network—as the transmission size is lightweight and can rapidly transmit, it is possible to effectively slow the transmission speed of the network at the individual user level with POW and therefore keep the number of transmissions less than available bandwidth. Additionally, the POW of verifying another user's block serves a useful purpose of increasing the weight of another user's valid block. As the block for verification is randomly selected, it is unlikely that a malicious user would be able to verify their own malicious history, and the potential for a user to validate their own history decreases in a linear path with the number of new users.

For a transmission to be verified, the transmission must not already be in the open ledger or must connect to a reference on the authoritative source, the transmission must be signed by the account owner, the account must have an open ledger space, and the previous transmission must be the head of the account-chain. If the previous transmission is not the head, it is invalid. During the POW, a weight of zero is applied to the non-head transmission. This serves to decrement the value of the invalid transmission and indicate to the system that the transmission is invalid.

The sender and receiver transmissions are timestamped and are therefore capable of maintaining asynchronous communication. As long as both the sender and receiver reference a DAG history that refers to the same authoritative source, they can communicate, irrespective of the possibility that there may be other concurrent DAG that the sender and receiver are unaware of. Ultimately, the reconciling of various DAG histories occurs at the authoritative node. This has the added advantage of allowing asynchronous transmission to occur at the sender and receiver level, which facilities transmissions in environments with limited connectivity due to recurring internet or power outages.

With the incorporation of quantum security into a DAG, the system is capable of rapid and low-cost asynchronous communications. In addition to the lightweight ledger that all users can maintain, it is also possible to include the addition of nodes that replace traditional DAG centralized authorities with a Byzantine series of nodes responsible for recording all transmissions. Traditionally, this hybrid blockchain/DAG technology has been impossible, but the incorporation of an immutable timestamp into the transmission that serves as a way of creating linked timestamps and validating the order of communications in the system may make it possible.

Similar to Bitcoin, a node serves as a timestamp server, which hashes a block of items to be timestamped and widely publishes the hash. In a blockchain, a block was a node of transactions. In the implementation of the present disclosure, it may be possible to hash a DAG history. The centralized nodes compete to provide a first-best hash. There is no limit to how quickly these transmissions can scale. Once the transmission record is reached, the system may deviate from a Nakamoto consensus.

As previously described, a solution may be provided through the use of a variant of Paxos called Secure Asynchronous Byzantine-Resilient Paxos (SABRPaxos), which combines Egalitarian Paxos (ePaxos) and xPaxos, and which builds upon the Paxos protocol introduced by Leslie Lamport in 1989 and named after the fictional legislative consensus system on the Paxos Island of Greece, where parliament had to function even though legislators continually wandered into and out of Parliament. Similar to the Paxos Protocol, the implementation of the present disclosure is an asynchronous, fault tolerant, and secure method of achieving decentralized consensus. In practice, this means that user DAG can be asynchronous and can enter and leave the network (due to, for example, power or networking failures) while still maintaining the security of the DAG.

SABRPaxos combines XPaxos to tolerate Byzantine failure, with features of Egalitarian Paxos (EPaxos) to achieve optimal commit latency even when failures occur, uniform load balancing across replicas to achieve high throughput, and graceful performance degradation when replicas are slow or crash. Building on Byzantine Paxos, for instance, with each user DAG having its own Paxos instance. Combined with EPaxos, which essentially guarantees that a large number of Byzantine failures will never occur, the security of Paxos with the Byzantine Fault Tolerance of XPaxos and the speed and reliability of EPaxos can be realized, without the need for centralization by relying on Byzantine Paxos. In this implementation, it may be possible to achieve greater than 50% security with low latency and high throughput, even when confronted with up to n−½ failures of nodes.

In the present disclosure, competing nodes race to calculate a predefined history of digital ledger entries and broadcast a hash of a historical block to a network of competing nodes, where the network of competing nodes arbitrate a first correct hash of the historical block using the SABRPaxos protocol, based on time-stamped and cryptographically signed hashes. Thus, similar to a Nakamoto consensus, operators of nodes may race to complete the first hash of the authoritative transmission history and its creation timestamp, and broadcast that first hash to the network using the SABRPaxos Protocol. Once more than 50% of all nodes have accepted the new XMSS hash, it is appended to the DAG history and becomes the new authoritative source for all subsequent DAG transactions.

It may be possible that this implementation will incentivize node operators towards two primary architecture solutions. First, node operators will be incentivized to purchase and operate machines that can quickly hash ledgers. Secondly, node operators will be incentivized to connect to users and other nodes so that they can quickly receive transmissions and then quickly transmit the solution to other nodes. It may be possible that the expensive computing centers maintained by proof-of-work operators will provide only marginal competitive advantage given that the proof in the present disclosure is a relatively simple hash, and that the primary delineator between node operators will be speed of communication, which will be determined by geography (physical distance between users and other nodes) and communication infrastructure (operating at the lowest levels of the OSI stack). Consequently, it is likely that the subject disclosure will reduce the environmental impact of distributed ledger technology.

Additionally, it is likely to incentivize the maximum number of nodes by providing the winner of the new authoritative source block with a reward derived from the operational profits of the system. This creates an economic incentive to maintain a primary node but also keeps the incentive low enough that mass centralization of nodes is financially detrimental. The addition of an award also serves to maintain a consistent balance in the value of the system awards.

As the system is designed around the asynchronous network model with byzantine faults, there is no need for a user to stay constantly synchronized to primary nodes in order to participate. The node maintains the record of all last transmission and updates through a three-way communication. If a system is offline, the three-way communication will fail, and the node will retain the last completed transmission in its record.

It may be beneficial of the subject disclosure to have easy integration into existing economic system, such as it adheres to Know Your Customer/Anti-Money Laundering (KYC/AML) regulations, among others. It is also recognized that a significant limitation in traditional distributed ledgers is the acceptance of those ledgers by established financial institutions and governments, whereas those distributed ledgers produced by centralized authorities such as state coins of financial institution issued coins are often met with skepticism by the cryptocurrency community As such, the present disclosure may include, in the distributed ledger, the fundamental components of an extendable password system that addresses traditional business weaknesses of cryptocurrency wallets. The first weakness of a cryptocurrency wallet is that a user may forget or lose the password to their wallet, and therefore lose access to the funds within their wallet. The second weakness of a cryptocurrency wallet is the lack of compliance with KYC/AML regulations. It is recognized that currency can be a neutral item, used for either ethical or unethical purposes, and that the control to deter criminal behavior with currency typically occurs at the financial institution level. Most cryptocurrencies, which rightly sought the greatest level of decentralization, have ignored the requirements for KYC/AML compliance. However, for a digital currency to achieve true exchange acceptance, it ideally must meet KYC/AML requirements. In practice, this necessitates that a digital currency keeps anonymity of all identifying information in transit and storage, while facilitating de-anonymization to allow KYC/AML compliance at the financial institution level.

Shamir's Secret Sharing offers a classical computing solution to this problem while also continuing information theoretic (i.e., post-quantum) security, dynamic access to the secret, and flexible access to a password. It is possible to build fields for true user identification into a distributed ledger account, then secure this information with post-quantum encryption. None of this identifying information leaves the account and transmits on the ledger; instead, it is the digital signature, anonymized with bulletproofs, that transmits on the network. At the access point, Shamir Secret Sharing may allow a user or a set and flexible number of financial institution employees access to the cryptocurrency wallet. In this manner, the subject disclosure can establish the mechanism for KYC/AML inherent into the blockchain, but place the onus on compliance back on the financial institution that user engages with. In this implementation, a user always has full access to their digital wallet, while the financial institution with which a user interacts has access to the digital wallet only when a sufficient (and user-approved) number of employees enter their portion of a secret. This process is akin to a bank safety deposit box.

Figure 4:
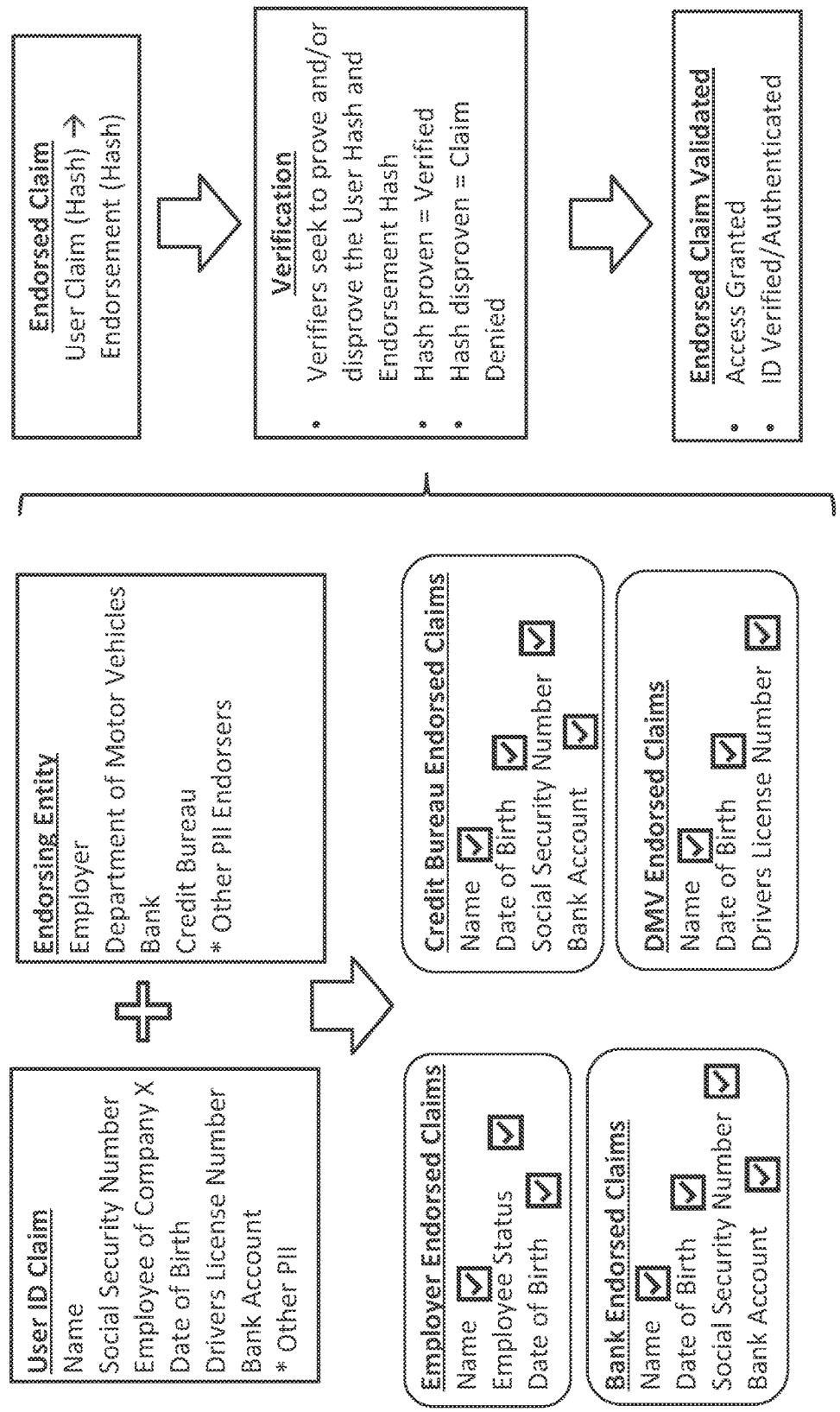
FIG. 4 is a diagrammatical illustration of a method and system of user information verification used with the method and system for decentralized confirmation of entries in a directed acyclic graph for rapidly confirming as authentic ledger entries without the need for centralized arbitration of authenticity of FIG. 1, in accordance with embodiments of the present disclosure.

This system of true user identification can also facilitate access and identity management for corporate login or replace existing physical identity verification through a driver's license, passport, or other identity document. This ability is described in FIG. 4, which is a diagrammatical illustration of a method and system of user information verification used with the method and system 10 for decentralized confirmation of entries in a directed acyclic graph for rapidly confirming as authentic ledger entries without the need for centralized arbitration of authenticity of FIG. 1, in accordance with embodiments of the present disclosure. As shown, in this implementation, the user fields in the account may be claimed by the user and cryptographically signed to the ledger, where the users ID claim is made using various user identifying information, or a portion thereof. An endorsing entity, such as a passport agency, an employer, or another entity, can act as a verifying authority to then make an equal claim about the identity holder and verifies that claim with a cryptographic signature. When the signatures from the user and the verifier match, the claim is therefore verified, with no need for details about the account holder to be disclosed to third parties. This implementation of distributed identity also allows a verifier to revoke their verification and remove all access dependent on the system; for example, if a contract employee no longer required system access, the owner of the contract could revoke their verification of system access on the ledger and the contract employee's access would no longer be valid anywhere in the world, as long as the verifying system referenced the distributed ledger for authentication.

The method and system 10 can be implemented or used in various ways. For instance, in one example, a user account that has multi-user access capability utilizing the algorithm from Shamir's Secret Sharing may be implemented, whereby user input is cryptographically obfuscated and recorded in a time-sequenced DAG. DAG entries are recorded when a sender and a receiver verify that both of their respective DAG point to the same DAG root. At this step, the sender must have an open block on their ledger and the sender transmits to the receiver. Prior to receiving, the sender verifies the communication of another randomly-selected sender through hashing and this verification, if true, is recorded as a weight appended to the other user's communication. The receiver creates a receive block on their DAG, referencing the hash of the associated send communication. All time-stamped DAG communications are transmitted to nodes that compete to order, confirm, and group DAG into a centralized history. These competing nodes publish fixed blocks of DAG history, with the first to publish a history accepted by more than half the network accepted as a new DAG root. This root is then broadcast to all users. Nodes are incentivized to compete for first to publish reliable transmission history because the first node to publish a history accepted by more than half of the nodes receives an adjustable reward of tokens that calculates based on 1) the number of communications in a fixed time period and 2) the total number of communications in the system.

In another example, the present disclosure can be directed to methods for rapid transaction and accounting reconciliation without the need for trust. For instance, a user account balance which is tied to a party trusted by the user and therefore restorable through the combined authorization of multiple users approved by the user, allows for near-instant transactions of any amount. The user identity is cryptographically secreted and obfuscated prior to transmission to the DAG while the transaction is clearly visible and auditable on the DAG. By recording on the DAG, the user verifies another user transaction (as the user's transaction is likewise verified by other users), adding a weight to the user's transaction. Nodes compete to record groups of DAG transactions and transmit a new authoritative source to users, keeping storage requirements on the users low. Nodes are incentivized for their efforts through a variable contribution of tokens, whose distribution is analogous to the Fisher equation in money supply.

In another example, the present disclosure may be directed to methods for rapid transmission and reconciliation of healthcare activities. For instance, a healthcare patient who's healthcare records are secured at an institution of the patient's choice, may undergo treatment at an alternate healthcare facility outside of the patient's accepted hospital network, such as in a foreign country. The records of the treatment and outcome are transmitted to the DAG by the facility, while the patient's identity is cryptographically secreted and obfuscated and known only to the patient, the patient's chosen healthcare provider, and the third party conducting the out-of-network treatment. By transmitting to the DAG, the third-party provider verifies the treatment of another obfuscated patient, as the patient's own treatment is also verified. Nodes compete to record groups of DAG treatments and transmit a new authoritative source to healthcare providers and patients, keeping storage requirements on patients and providers low. Nodes are incentivized for their efforts through a variable contribution of tokens, whose distribution is analogous to service demand in a traditional hospital treatment scenario.

In yet another example, the present disclosure can be directed to methods for rapid accounting and transmission of inventories. For instance, an inventory manager at a first business, who is one of several approved to modify an inventory in a multi-user inventory ledger, records the transmission of inventory to a requesting second business's inventory with which the first business has no previous relationship. The transmission of the inventory is recorded to the DAG when the first business verifies the inventory transmission of a randomly-selected third party. Nodes compete to record groups of inventory transactions, keeping storage requirements on independent businesses and users low. Nodes are incentivized for their efforts through a variable contribution of tokens, whose distribution is analogous to the demand indicator in a traditional supply-demand equation.

Any other variations or alterations to the method and system 10 and method may also be used, depending on the implementation and/or intended use of the subject disclosure, all such variations and alterations are considered within the scope of the present disclosure.

It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for decentralized confirmation of entries in a directed acyclic graph (DAG) for rapidly confirming as authentic ledger entries without centralized arbitration of authenticity, the method comprising:
   providing access to at least one user account by applying Shamir Secret Sharing (SSS) to the at least one account, wherein the user account is accessible to a single user and to combined efforts of multiple authorized third-party users appointed by the single user;
   cryptographically obfuscating an identity of at least one user account using post-quantum cryptography and transmitting a DAG communication having a quantity of data from the at least one user account to the DAG;
   weighting DAG communications via proof-of-work hashing conducted on randomly-selected third-party DAG users;
   recording and reconciling DAG communications at nodes that compete to achieve consensus using Secure Asynchronous Byzantine-Resilient Paxos (SABRPaxos) protocol, thereby confirming entries in the DAG; and
   incentivizing nodes for quickly recording and reconciling DAG communications by rewarding tokens that are variably determined by calculating the number of communications in a fixed time period and a total number of communications.

2. The method of claim 1, wherein competing nodes race to calculate a predefined history of digital ledger entries and broadcast a hash of a historical block to a network of competing nodes, wherein the network of competing nodes arbitrate a first correct hash of the historical block using the SABRPaxos protocol, based on time-stamped and cryptographically signed hashes.

3. The method of claim 1, wherein the post-quantum cryptography further comprises using eXtended Merkle Signature Schemes (XMSS).

4. The method of claim 1, wherein cryptographically obfuscating the identity of at least one user account further comprises using bulletproof zero-knowledge proofs.

5. The method of claim 1, wherein entries in the DAG further comprise rapid transaction and accounting entries.

6. The method of claim 5, wherein the at least one user account further comprises a user wallet of the single user and the multiple authorized third-party users appointed by the single user further comprise authorized third-party personnel of a financial institution.

7. The method of claim 1, wherein entries in the DAG further comprise healthcare activity entries.

8. The method of claim 7, wherein the at least one user account further comprises a patient healthcare record of the single user, wherein the quantity of data further comprises at least one treatment record in the patient healthcare record, and the multiple authorized third-party users appointed by the single user further comprise authorized third-party personnel of a healthcare provider.

9. The method of claim 1, wherein entries in the DAG further comprise inventory entries.

10. The method of claim 9, wherein the at least one user account further comprises a business inventory ledger of the single user, wherein the quantity of data further comprises at least one transaction in the business inventory ledger, and the multiple authorized third-party users appointed by the single user further comprise authorized business inventory managers.

11. A system for decentralized confirmation of entries in a directed acyclic graph (DAG) for rapidly confirming as authentic ledger entries without centralized arbitration of authenticity, the system comprising:
    a computerized device having a processor and a non-transitory memory, the computerized device having an application, wherein the application includes instruction executable by the processor, the instructions comprising:
        providing access to at least one user account by applying Shamir Secret Sharing (SSS) to the at least one account, wherein the user account is accessible to a single user and to combined efforts of multiple authorized third-party users appointed by the single user;
        cryptographically obfuscating an identity of at least one user account using post-quantum cryptography and transmitting a DAG communication having a quantity of data from the at least one user account to the DAG;
        weighting DAG communications via proof-of-work hashing conducted on randomly-selected third-party DAG users;
        recording and reconciling DAG communications at nodes that compete to achieve consensus using Secure Asynchronous Byzantine-Resilient Paxos (SABRPaxos) protocol, thereby confirming entries in the DAG; and
        incentivizing nodes for quickly recording and reconciling DAG communications by rewarding tokens that are variably determined by calculating the number of communications in a fixed time period and a total number of communications.

12. The system of claim 11, wherein competing nodes race to calculate a predefined history of digital ledger entries and broadcast a hash of a historical block to a network of competing nodes, wherein the network of competing nodes arbitrate a first correct hash of the historical block using the SABRPaxos protocol, based on time-stamped and cryptographically signed hashes.

13. The system of claim 11, wherein the post-quantum cryptography further comprises using eXtended Merkle Signature Schemes (XMSS), and wherein cryptographically obfuscating the identity of at least one user account further comprises using bulletproof zero-knowledge proofs.

14. The system of claim 11, wherein entries in the DAG further comprise rapid transaction and accounting entries.

15. The system of claim 14, wherein the at least one user account further comprises a user wallet of the single user and the multiple authorized third-party users appointed by the single user further comprise authorized third-party personnel of a financial institution.

16. The system of claim 11, wherein entries in the DAG further comprise healthcare activity entries.

17. The system of claim 16, wherein the at least one user account further comprises a patient healthcare record of the single user, wherein the quantity of data further comprises at least one treatment record in the patient healthcare record, and the multiple authorized third-party users appointed by the single user further comprise authorized third-party personnel of a healthcare provider.

18. The system of claim 11, wherein entries in the DAG further comprise inventory entries.

19. The system of claim 18, wherein the at least one user account further comprises a business inventory ledger of the single user, wherein the quantity of data further comprises at least one transaction in the business inventory ledger, and the multiple authorized third-party users appointed by the single user further comprise authorized business inventory managers.

20. A method for decentralized confirmation of entries in a directed acyclic graph (DAG) for rapidly confirming as authentic ledger entries without centralized arbitration of authenticity, the method comprising:
  providing access to at least one user account by applying a cryptographic algorithm to the at least one account, wherein the user account is accessible to a single user and to combined efforts of multiple authorized third-party users appointed by the single user;
  cryptographically obfuscating an identity of at least one user account using post-quantum cryptography and transmitting a DAG communication having a quantity of data from the at least one user account to the DAG;
  weighting DAG communications via proof-of-work hashing conducted on randomly-selected third-party DAG users;
  recording and reconciling DAG communications at nodes that compete to achieve consensus using Secure Asynchronous Byzantine-Resilient Paxos (SABRPaxos) protocol, thereby confirming entries in the DAG, wherein the SABRPaxos protocol is formed from XPaxos and features of EPaxos; and
  incentivizing nodes for quickly recording and reconciling DAG communications by rewarding tokens that are variably determined by calculating the number of communications in a fixed time period and a total number of communications.

* * * * *